April 3, 1934.  E. GIEBE ET AL  1,953,220
MOUNTING FOR TRANSVERSAL RESONATORS
Filed Nov. 2, 1929
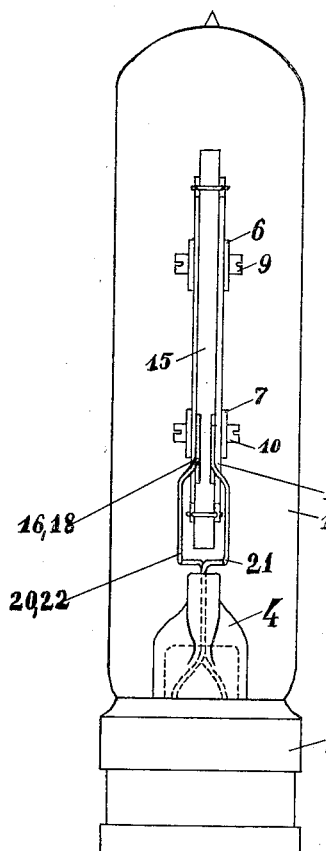
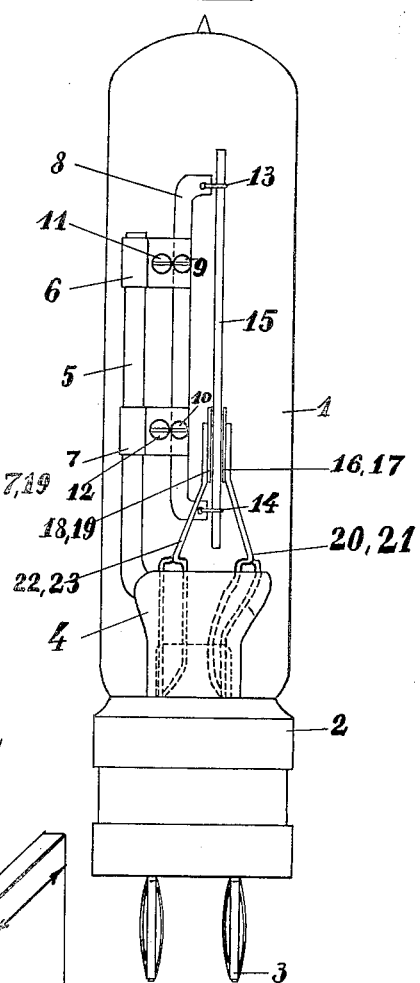
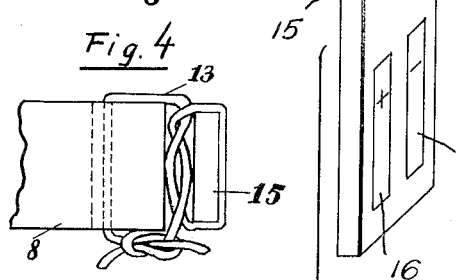
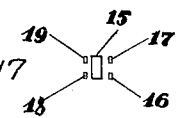
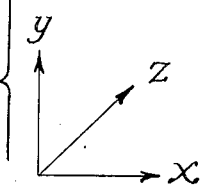
Inventors:
Erich Giebe
Adolf Scheibe Patented Apr. 3, 1934

1,953,220

UNITED STATES PATENT OFFICE 1,953,220

MOUNTING FOR TRANSVERSAL RESONATORS

Erich Giebe and Adolf Scheibe, Berlin, Germany

Application November 2, 1929, Serial No. 404,396
In Germany November 3, 1928

4 Claims. (Cl. 171—327)

The subject of our present invention is an arrangement to practice the method described in our application Ser. No. 248,145, filed on January 20, 1928, now Patent No. 1,869,556, August 2, 1932, for the piezo-electrical excitation of elastic transverse or torsional or other vibrations of piezoelectric crystals. That patent specification specifies the conditions under which transverse and torsional vibrations may be excited in piezo-electric crystals, the alignment of the crystals and the arrangement of the electrodes in relation to the axial directions of the crystal being especially dealt with in detail.

It has now been demonstrated that these conditions cannot, of necessity, be physically realized and it has hitherto proved impossible to support the crystals in such manner that strong vibrations are formed. It has, for instance, been discovered that an arrangement on edges does not attain the desired end and causes disturbances of every kind.

The applicants have now succeeded in removing these difficulties and in producing a perfect arrangement for the piezo-electric arrangement of transverse and torsional vibrations. According to the invention the crystals are supported in such a manner that their vibrations cannot be transmitted to the supports. The applicants have further recognized that the crystal must be indirectly supported upon the carrier which should be of great bulk and very stable. It is therefore essential that the elastic coupling between the crystal and the carrier should be made as loosely as possible. For that reason, too, unelastic material is used for the separator and a metal wire is generally not suitable for attaching the crystal to the carrier. Tests have proved, on the other hand, that a thread of yarn or the like is excellently suited to tie the crystal.

The attachment is made in the nodes of vibration. In order that strong vibrations may develop it is very important that the support is limited as exactly as possible to the nodes and that the crystal is mounted in such a manner that it cannot move. It is of advantage for this purpose to scratch the crystal rods slightly at the nodal points, for instance by the crystal surfaces being covered with emery and scratched slightly with a metal foil.

The support according to our invention relates in the first place to crystal rods which according to the layers described in the application No. 248,145 are cut out of the crystal body. According to an example of that patent specification the longitudinal direction of the crystal rod lies, for example, along a neutral axis. The thickness of the crystal lies in the direction of the electrical axis while the depth of the crystal vertical to the plane of the drawing lies in the direction of the optical axis.

Our invention is explained by a constructive example. Fig. 1 is the front view and Fig. 2 the side view of the mounting, according to our invention, of a crystal for the piezo-electric excitation of transverse and torsional vibrations. Fig. 3 shows the plan of the crystal with the electrode arrangement, Fig. 4 on an enlarged scale the connection of the crystal rod and the carrier in a node. Fig. 5 is a diagrammatic view illustrating the arrangement of the electrodes with reference to the axes of the crystal element.

In detail 1 is a glass vessel, 2 the base, 3 are four plug pins for connecting the vessel to the exciting voltages. 4 is the press through which the four fusings are passing and to which the arm 5 is attached. This arm supports two cuffs 6 and 7 to which the bridge 8 is fastened by the screws 9 and 10. The screws 11 and 12 serve for the staying of the cuffs 6 and 7.

The ends of the bridge 8 which are bent off in U shape have 2 holes through which a thread 13 and 14 each is wound round the crystal rod 15. The manner of winding is shown in Fig. 4. It illustrates that the crystal rod is not directly fastened to the bridge 8 but that between the crystal rod and the bridge the thread 13 is passing.

It is further essential to the arrangement according to our invention that the four electrodes 16, 17 and 18, 19 are placed in such a manner that they run from a node towards the centre of the crystal. This is of particular importance for the arrangement of higher harmonics. As to the rest the length of the electrodes is decisive for the excitation of a definite higher harmonic. It has been discovered that in this manner particularly strong vibrations are produced.

The arrangement shown in the drawing is completed by the leading-in wires 20 and 21 to the electrodes 16 and 17 and by the leading-in wires 22 and 23 to the electrodes 18 and 19.

For the development of strong amplitudes it is further important that the electrodes 16 to 19 do not touch the crystal, but are situated at as small as possible a distance, for instance from 0.2 to 0.3 mm. from the crystal surface.

The mounting according to the invention is by no means limited to this constructive example. There is thus no objection to arranging only two instead of four plug pins and to making the branches to the corresponding electrodes only inside the vessel. The leading out of all four electrodes has, however, the advantage that the connections may be exchanged at will, for instance, for the purpose of exciting the crystal rod longitudinally. This is done, if, for instance, the same potential is applied to the pair of electrodes 16 and 17 and the opposite one to the pair of electrodes 18 and 19.

Fig. 5 shows a crystal rod the longitudinal direction of which lies along a neutral axis (Y) of the crystal, the thickness of which lies in the direction of the electrical axis (X) of the crystal, the depth of which lies in the direction of the optical axis (Z) of the crystal. If the electrodes 16 and 17 are fitted, in the manner illustrated in Fig. 5, on a crystal side lying in the Y—Z face, and the electrodes 18, 19 (not shown in the drawing), of the parallel crystal side at the back, and if an alternating electrical voltage the frequency of which is equal to the elastical self-oscillation of the crystal rod, is put on these electrodes, the potential of this electrical voltage being opposite on opposite sides and the same side of said crystal rod, the crystal rod is excited to vibrations in the direction of the Z-axis, i. e. in the direction of the double arrow.

The mounting according to our invention is applied both in the case of resonators and of oscillators. In the former case a neon or helium charge is introduced into the evacuated vessel for the excitation of the luminous phenomena according to the Patent Number 1,685,810. According to a further subject of our invention the gas charge is given a pressure of about 1.3 mm. Hg. This pressure proves to be the most favourable, especially as with it the quartz light emission as a resonance phenomenon is produced at relatively low exciting voltages.

The method according to our invention is further also suitable for the excitation of torsional vibrations.

We claim:

1. Mounting for transversal resonator comprising an evacuated vessel and inside said vessel a piezo-electric crystal, electrodes for exciting vibrations of said piezo-electric crystal, a solid U-shaped carrier of metal provided for holding said piezo-electric crystal in several nodal points of vibration, a thread of yarn passing through the holes provided at the ends of said carrier and wound round the crystal as well as passed between the crystal and the faces of said carrier, an arm of glass attached to the press of said vessel, several cuffs and screws provided for fastening said U-shaped carrier at said arm of glass.

2. Mounting for transversal resonator comprising an evacuated vessel and inside said vessel a piezo-electric crystal, electrodes for exciting vibrations of said piezo-electric crystal, said electrodes being situated in a distance of about 0.2 mm. from the crystal surface, a solid U-shaped carrier of metal provided for holding said piezoelectric crystal in several nodal points of vibration, a thread of yarn passing through the holes provided at the ends of said carrier and wound round the crystal as well as passed between the crystal and the faces of said carrier, an arm of glass attached to the base of said vessel, several cuffs and screws provided for fastening said U-shaped carrier at said arm of glass.

3. Mounting for transversal resonator, comprising a vessel filled with a rare gas of a suitable low pressure, and inside said vessel a piezo-electric crystal, electrodes for exciting vibrations of said piezo-electric crystal, a solid U-shaped carrier of metal provided for holding said piezoelectric crystal in one or several nodal points of vibration, a thread of yarn passing through the holes provided at the ends of said carrier and wound round the crystal as well as passed between the crystal and the faces of said carrier, an arm of glass attached to the press of said vessel, several cuffs and screws provided for fastening said U-shaped carrier at said arm of glass.

4. Mounting for transversal resonator, comprising a vessel filled with neon of a suitable low pressure, and inside said vessel a piezo-electric crystal, electrodes for exciting vibrations of said piezo-electric crystal, a solid U-shaped carrier of metal provided for holding said piezo-electric crystal in one or several nodal points of vibration, a thread of yarn passing through the holes provided at the ends of said carrier and wound round the crystal as well as passed between the crystal and the faces of said carrier, an arm of glass attached to the press of said vessel, several cuffs and screws provided for fastening said U-shaped carrier at said arm of glass.

ERICH GIEBE.
ADOLF SCHEIBE.